(12) United States Patent
Luft et al.

(10) Patent No.: US 9,559,761 B2
(45) Date of Patent: Jan. 31, 2017

(54) PROXIMITY-BASED SERVICES DISCOVERY PRIVACY

(71) Applicant: Intel IP Corporation, Santa Clara, CA (US)

(72) Inventors: Achim Luft, Braunschweig (DE); Muthaiah Venkatachalam, Beaverton, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/141,843

(22) Filed: Dec. 27, 2013

(65) Prior Publication Data

US 2014/0357228 A1 Dec. 4, 2014

Related U.S. Application Data

(60) Provisional application No. 61/829,968, filed on May 31, 2013.

(51) Int. Cl.
*H04M 1/66* (2006.01)
*H04B 7/04* (2006.01)
(Continued)

(52) U.S. Cl.
CPC .......... *H04B 7/0456* (2013.01); *H04B 7/0452* (2013.01); *H04B 7/0486* (2013.01);
(Continued)

(58) Field of Classification Search
CPC ...... H04B 7/0456; H04W 12/02; H04W 48/16
(Continued)

(56) References Cited

U.S. PATENT DOCUMENTS 8,639,198 B2   1/2014  Liu et al.
9,071,297 B2   6/2015  Chen et al.
(Continued)

FOREIGN PATENT DOCUMENTS

CN   105144647 A   12/2015
CN   105165042 A   12/2015
(Continued)

OTHER PUBLICATIONS

"3rd Generation Partnership Project; Technical Specification Group Radio Access Network; Evolved Universal Terrestrial Radio Access (E-UTRA) Medium Access Control (MAC) protocol specification (Release 8)", 3GPP TS 36.321 V8.1.0, (Mar. 2008), 30 pgs.
(Continued)

*Primary Examiner* — Babar Sarwar
(74) *Attorney, Agent, or Firm* — Schwegman Lundberg & Woessner, P.A.

(57) ABSTRACT

This application discusses, among other things, apparatus and methods for providing device-to-device (D2D) discovery privacy. In an example, a method can include transmitting a first temporary identification and first discovery information from a first user equipment (UE), the discovery information authorizing discovery of the first UE; and receiving a request from a second UE to join a device-to-device network with the first UE using a second temporary identification associated with the second UE.

19 Claims, 7 Drawing Sheets

(51) Int. Cl.
  *H04B 7/06* (2006.01)
  *H04W 12/02* (2009.01)
  *H04W 48/16* (2009.01)
  *H04W 28/02* (2009.01)
  *H04L 27/20* (2006.01)
  *H04W 76/02* (2009.01)

(52) U.S. Cl.
  CPC .......... *H04B 7/063* (2013.01); *H04B 7/0617* (2013.01); *H04B 7/0626* (2013.01); *H04B 7/0632* (2013.01); *H04B 7/0639* (2013.01); *H04L 27/20* (2013.01); *H04W 12/02* (2013.01); *H04W 28/0289* (2013.01); *H04W 48/16* (2013.01); *H04W 76/023* (2013.01)

(58) Field of Classification Search
  USPC ..... 455/41.1, 411, 436, 422.1, 456.1, 550.1; 370/328, 338
  See application file for complete search history.

(56) References Cited

U.S. PATENT DOCUMENTS

| | | | |
|---|---|---|---|
| 2010/0189071 A1* | 7/2010 | Kitazoe | H04W 74/002 370/331 |
| 2010/0268775 A1 | 10/2010 | Doppler et al. | |
| 2011/0098043 A1 | 4/2011 | Yu et al. | |
| 2012/0079019 A1* | 3/2012 | Miettinen et al. | 709/204 |
| 2012/0079109 A1 | 3/2012 | Klein et al. | |
| 2012/0087425 A1 | 4/2012 | Gomadam et al. | |
| 2012/0093098 A1 | 4/2012 | Charbit et al. | |
| 2012/0218948 A1 | 8/2012 | Onggosanusi et al. | |
| 2012/0219042 A1 | 8/2012 | Onggosanusi et al. | |
| 2012/0220286 A1 | 8/2012 | Chen et al. | |
| 2013/0040677 A1 | 2/2013 | Lee et al. | |
| 2013/0077704 A1 | 3/2013 | Ding et al. | |
| 2014/0086352 A1 | 3/2014 | Ko et al. | |
| 2014/0092885 A1* | 4/2014 | Venkatachalam et al. | 370/338 |
| 2014/0169300 A1 | 6/2014 | Kim et al. | |
| 2014/0219219 A1 | 8/2014 | Onggosanusi et al. | |
| 2014/0254701 A1 | 9/2014 | Geirhofer et al. | |
| 2014/0286452 A1 | 9/2014 | Gomadam et al. | |
| 2014/0355705 A1 | 12/2014 | Chen et al. | |
| 2016/0006493 A1 | 1/2016 | Chen et al. | |

FOREIGN PATENT DOCUMENTS

| | | |
|---|---|---|
| KR | 1020120031895 A | 4/2012 |
| WO | WO-2007044597 A2 | 4/2007 |
| WO | WO-2014193718 A1 | 12/2014 |
| WO | WO-2014193749 A1 | 12/2014 |

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 10)", 3GPP TS 36.321 V10.0.0, (Dec. 2010), 53 pgs.

"U.S. Appl. No. 14/108,648, Non Final Office Action mailed Oct. 21, 2014", 8 pgs.

"U.S. Appl. No. 14/108,648, Notice of Allowance mailed Feb. 25, 2015", 16 pgs.

"U.S. Appl. No. 14/108,648, Response filed Jan. 21, 2015 to Non Final Office Action mailed Oct. 21, 2014", 13 pgs.

"International Application Serial No. PCT/US2014/039072, International Search Report mailed Sep. 25, 2014", 4 pgs.

"International Application Serial No. PCT/US2014/039072, Written Opinion mailed Sep. 26, 2014", 5 pgs.

"International Application Serial No. PCT/US2014/039313, International Search Report mailed Sep. 26, 2014", 4 pgs.

"International Application Serial No. PCT/US2014/039313, Written Opinion mailed Sep. 26, 2014", 5 pgs.

"U.S. Appl. No. 14/739,815, Preliminary Amendment filed Sep. 30, 2015", 8 pgs.

"U.S. Appl. No. PCT/US2014/039072, International Preliminary Report on Patentability mailed Dec. 10, 2015", 7 pgs.

"U.S. Appl. No. PCT/US2014/039313, International Preliminary Report on Patentability mailed Dec. 10, 2015", 7 pgs.

"Taiwanese Application Serial No. 103118240, Office Action mailed Jun. 16, 2015", 15 pgs.

U.S. Appl. No. 14/739,815, filed Jun. 15, 2015, User Equipment and Methods for Codebook Subsampling for Enhanced 4TX Codebooks.

* cited by examiner

PROXIMITY-BASED SERVICES DISCOVERY PRIVACY

CLAIM OF PRIORITY AND RELATED APPLICATIONS

This patent application claims the benefit of priority, under 35 U.S.C. Section 119(e), to U.S. Provisional Patent Application No. 61/829,968, filed May 31, 2013 which is hereby incorporated by reference herein in its entirety.

BACKGROUND

Proximity-based applications and services (ProSe) represent a fast growing social and technological trend that may have a major impact on the evolution of cellular wireless/mobile broadband technologies. These services can be based on the awareness that two devices or two users are close to each other and, thus, may be able to directly communicate with each other.

OVERVIEW

This application discusses, among other things, apparatus and methods for providing device-to-device (D2D) discovery privacy. In an example, a method can include transmitting a first temporary identification and first discovery information from a first user equipment (UE), the discovery information authorizing discovery of the first UE; and receiving a request from a second UE to join a device-to-device network with the first UE using a second temporary identification associated with the second UE.

This overview is intended to provide a general overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

In certain wireless protocols, D2D communications have been attempting some form of standardization. For example, proximity-based services (ProSe), such as 3GPP (Third Generation Partnership Project) proximity-based services, may include the following aspects for the discovery function as defined in TS 22.101:

Based on operator policy and user choice, proximity of two ProSe-enabled devices (sometimes referred to as User Equipment, or "UEs") can be determinable; for example, using direct radio signals or via the operator network;

A discovering ProSe-enabled UE can determine whether or not another ProSe-enabled UE is of interest to it. A ProSe-enabled UE is of interest to a discovering ProSe-enabled UE if its proximity needs to be known by one or more authorized applications on the discovering ProSe-enabled UE;

Subject to user and operator settings, aProSe-enabled UE can be able to be discoverable by other ProSe-enabled UEs in proximity that are explicitly permitted by the discoverable ProSe-enabled UE.

The ProSe-enabled UEs can be served by the same or different PLMN, including when roaming.

All requirements for ProSe Discovery can also apply when one or both of the ProSe-enabled UEs involved in ProSe Discovery are roaming in a VPLMN.

ProSe can support the simultaneous operation of a large number of applications on a ProSe-enabled UE, ensuring that the 3GPP system provides ProSe Discovery proximity information only to applications that are authorized by the 3GPP operator.

The ProSe system can allow both granting and revocation of discovery permissions.

Figure 1:
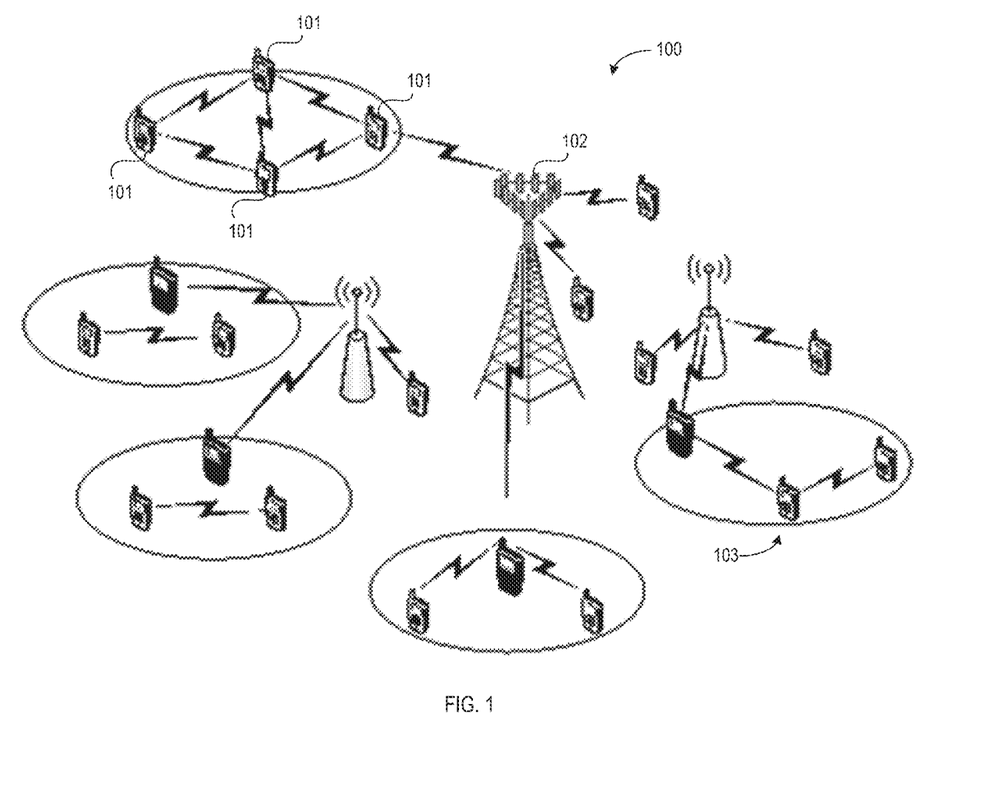
FIG. 1 illustrates generally an example wireless system including D2D users.

FIG. 1 illustrates generally an example wireless system 100 including D2D users (a typical few labeled 101) operating and coexisting with traditional cellular users. Unlike the existing traditional LTE network infrastructure, D2D users 101 do not necessarily need to communicate via the central coordinator (eNodeB) 102. In certain examples, the D2D users 101 can communicate directly with each other or through hops 103 of other D2D users. When D2D communication shares the same resources with the mobile broadband system, certain functions can still be controlled and coordinated by the eNodeB 102 of the mobile broadband network such as when centralized control offers more benefits.

In certain examples, proximity sensing methods can be implemented by the network through monitoring the UE attachment/association to a particular cell or using location based services and protocols. In addition to these traditional methods, new proximity based functionality can be added to the functions of the D2D coordinator. For example, a special device discovery zone can be allocated in the D2D transmission region where device discovery signaling is used to assist in D2D cluster organization and D2D link establishment. A special discovery signal transmission interval can be introduced in the D2D transmission region for that purpose. Additionally, proximity sensing can be based on D2D link quality measurements.

In addition to the above aspects of a D2D communication system, the present inventors have recognized methods and apparatus for providing privacy of permanent identification (ID) information of a UE during the discovery function by using temporary IDs. In certain examples, privacy can be provided during the discovery function, such as the ProSe discovery function while also fulfilling all the above—listed services. This description often references the ProSe discovery function, but it is understood that certain aspects of the present subject matter are possible with other D2D protocols and discovery activities. In certain examples, a temporary ID can be allocated to each D2D UE. In certain examples, a temporary ID can be allocated to each D2D application available to a UE. In some examples, the temporary ID can be changed often and frequently. In some examples, the temporary ID can be published such as by the UE itself or by network resources without revealing the permanent ID of the UE or the user.

In certain examples, the temporary ID can be randomly generated in the UE network resources and sent to the UE. In some examples, the temporary ID can be generated using a permutation algorithm running on the UE and running simultaneously on a network resource. In certain examples, a UE or an application running on the UE can request that a discovered UE's temporary ID be resolved. In certain examples, the request can be serviced by a network resource. In some examples, the discovered UE can service the request using direct communications with the requesting UE or requesting application. In certain examples, the request can be answered with the permanent identity of the discovered UE or the discovered application. In some examples, the request can be answered with the permanent identity of the discovered UE or the discovered application only if the requesting UE or application has been authorized.

In certain examples, the present subject matter provides a layer of user privacy protection to D2D enabled devices. Without such protection, D2D communication services, such as ProSe services, would reveal user IDs and, in some situations, would reveal user IDs in combination with current location information of the user's UE. As such, without additional privacy protection, proximity services, such as ProSe services, can be a threat to a user's identity information (e.g., identity threat) as well as a physical threat as it can provide location information of the user. Some privacy solutions can be implemented in the application layer, however, applications in open mobile operating systems, in general, cannot be trusted to provide privacy protection or relied on to provide adequate privacy protection. The present subject matter provides privacy protection at the system level. In certain examples, system level privacy protection can be provided. In some examples, system privacy systems do not deliver ProSe discovery information to applications. In addition, ProSe discovery data is encrypted such that unauthorized applications are not able to decrypt the information.

In certain examples, privacy protection can include an allocation between a permanent user ID, such as an e-mail address or an application specific e-mail address (e.g., john.doe@facebook.com) and a temporary ID (e.g., 34ff8e108a23 cc). In some examples, resolution of the temporary ID can reveal the permanent ID. In certain examples, resolution of the temporary ID can be done by the network or a network resource. In some examples, resolution of the temporary ID can be done at an authorized UE such as at the discoverable UE or an authorized UE receiving discovery information including the temporary ID. In some examples, for the time the temporary ID is valid (e.g., for the time the temporary ID remains the same) a UE once discovered can be recognized.

In certain examples, after the temporary ID has been changed, a discoverer UE cannot recognize the UE associated with the new temporary ID and can request a new resolution of the new temporary ID. In some examples, if authorization of a specific user, application or UE is revoked, the temporary ID can be changed and each request by the revoked user, application or UE can be denied. In certain examples, temporary ID allocations to provide privacy to proximity-base service users can be especially beneficial where discovery information can be automatically broadcast by a UE without the network to assist the discovery function.

As discussed above, in some examples, allocation between temporary IDs and the permanent ID of the UE can be stored at the UE. In some examples, where ProSe discovery is assisted by the network, allocation between temporary IDs and the permanent ID of the UE can be stored on network resources. In some examples, in order to change a temporary ID, allocation messages are exchanges between the network and the UE. In some examples, temporary ID allocations can be generated using a synchronized (e.g., time-based) permutation algorithm. In an example, a permutation function of such a system can be to encrypt the current date/time with a pre-shared secret. It is understood that there are other permutation functions that are possible without departing from the scope of the present subject matter. Such time-based permutation functions, in certain examples, can significantly reduce the number of messages between a UE and the network. The next sections describe illustrative examples of systems for providing privacy protection for users of proximity-based services.

Figure 2:
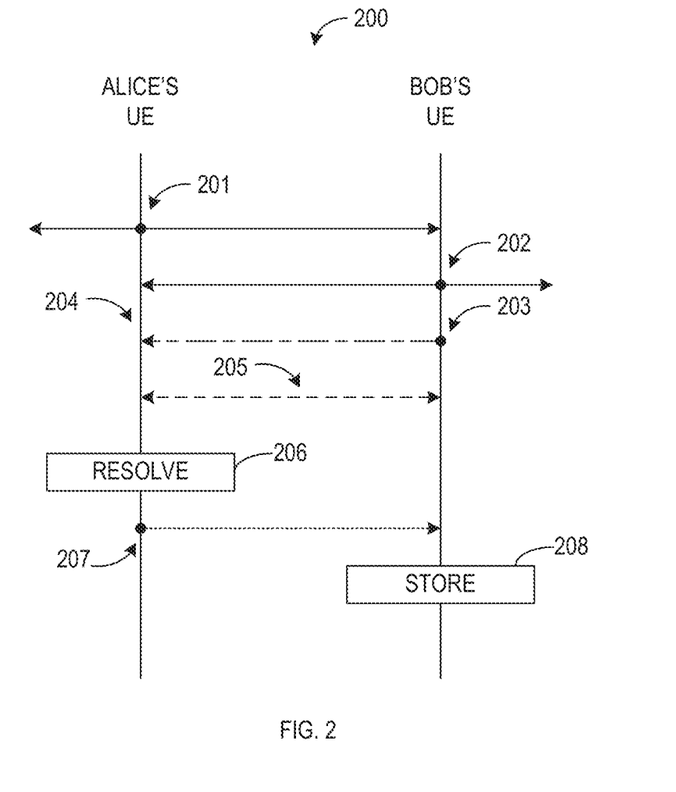
FIG. 2 illustrates an example method of providing D2D discovery privacy using temporary IDs.

FIG. 2 illustrates an example method 200 of providing D2D discovery privacy using temporary IDs. Alice's UE is a subscriber of ProSe offered by operator A. Bob's UE is a subscriber of ProSe offered by operator B. David is also a subscriber of ProSe offered by operator B. Alice, Bob, and Dave use ProSe with different applications. They use different permanent IDs for these different applications. For example, Dave likes to play chess and he uses a ProSe enabled application called "chess-pal". He authorizes every user of chess-pal in proximity to discover him as potential chess player. His permanent identity for this application is "dave72@chesspal.com". Alice, Bob, and Dave also belong to or are registered on a social website, such as Facebook. There permanent IDs are "alice@facebook.com", "bob@facebook.com", and "dave@facebook.com". Alice and Bob are friends and they authorize each other to be discovered with their facebook identities whenever they are in proximity of each other. Alice and Dave are friends as well and so they authorize each other to be discovered with their facebook identities whenever they are in proximity of each other as well. Bob and Dave do not know each other very well and they have not authorized the other to discover them. If Dave's permanent identity (dave@facebook.com) could be revealed by a discovery function, Bob could be able to discover and identify Dave even though he is not authorized to do so. If the permanent identity was bound to another permanent identity Bob would indeed not be able to discover Dave, but Alice would be able to discover him even after Dave might have revoked her authorization. Therefore, in certain examples, each permanent identity (e.g., facebook and chess-pal) can be allocated to a temporary ID. The IDs for this example are listed in the following table.

| Subscriber | Application | Permanent ID | Temporary ID |
| --- | --- | --- | --- |
| Alice | Facebook | alice@facebook.com | SM-OJFXGUOIJCS3PKM5 |
| Bob | Facebook | bob@facebook.com | SM-D62321VQT8INCNMT |
| Dave | Facebook | david@facebook.com | SM-BPO74QJMTFEAK6H0 |
| Dave | Chess-pal | david72@chesspal.com | GA-9IPGPJB7E91703AW |

In this example, the first two letters can signal the type of application. SM can indicate that the temporary ID is an ID for social media like Facebook or google+. GA can indicate that the temporary ID is an ID for gaming like chess-pal or WoW. Another example of temporary IDs could just replace the personal permanent part of the ID with an alias such as OJFXGUOIJCS3PKM5@facebook.com. In this case, the specific application can be indicated and the information that a user of this application is in proximity is revealed, but the identity of the user is still unknown. In another example, a user setting can be used to determine which format to use for discovery. In certain examples, D2D discovery can progress as follows:

All proximity service enabled UEs are sending their temporary IDs. At 201, Alice's UE is broadcasting "SM-OJFXGUOIJCS3PKM5". At 202, Bob's UE is broadcasting "SM-D62321VQT81NCNMT". Dave's UE is broadcasting "SM-BPO74QJMTFEAK6H0, GA-9IPGPJB7E91703AW". Dave is sending all the temporary Ids he wants to be discoverable with. If Alice and Bob are in proximity to each other, their UEs are receiving the beacons from the other UEs. Since the unknown temporary ID of Alice is an ID for social media, the ProSe enabled facebook application running on Bob's UE can transmit a request message at 203 requesting to resolve Alice's temporary ID. In certain examples, security can be in place (e.g. a digital signature) to ensure that the request is sent by an operator-authorized user and application. In some examples, the request can also contain a resolution number (e.g., 3456). At 204, Alice's UE can receive the request. In some examples, Alice can have her UE resolve her temporary ID without knowing who made the request. In some examples, at 205, Alice can try to identify the requestor before resolving or denying the resolution request. Such identification methods can include, but are not limited to, sending text messages asking who is at or near her location, looking around and trying to identify people she may know, such as her friend Bob, and then verifying that he sent the request including using the resolution number. If questioned, either online or offline, Bob can confirm he sent the request with the resolution number. In certain examples, Alice can authorize the resolution. At 206, Alice's UE can resolve her temporary ID, and at 207, Alice's UE can send her permanent ID to Bob's UE. In certain examples, the Alice's permanent ID can be sent using D2D communications. In some examples, the permanent ID information can be protected such as through encryption such that Alice's permanent ID remains confidential except to the application running on Bob's UE.

In certain examples, a similar method of authorization can take place if a social media application running on Bob's UE was discovered by Alice's UE. In certain examples, after cross authorization of Bob and Alice to each other's social media applications, the allocation between permanent ID and temporary ID of Bob can be stored in Alice's UE. Likewise, the allocation between permanent ID and temporary ID of Alice can be stored in Bob's UE, such as at 208. As long as the temporary IDs keep the same, Bob and Alice can discover each other. As such, in the future, Alice's facebook application can prompt her whenever Bob's UE is in proximity and vice versa.

Figure 3:
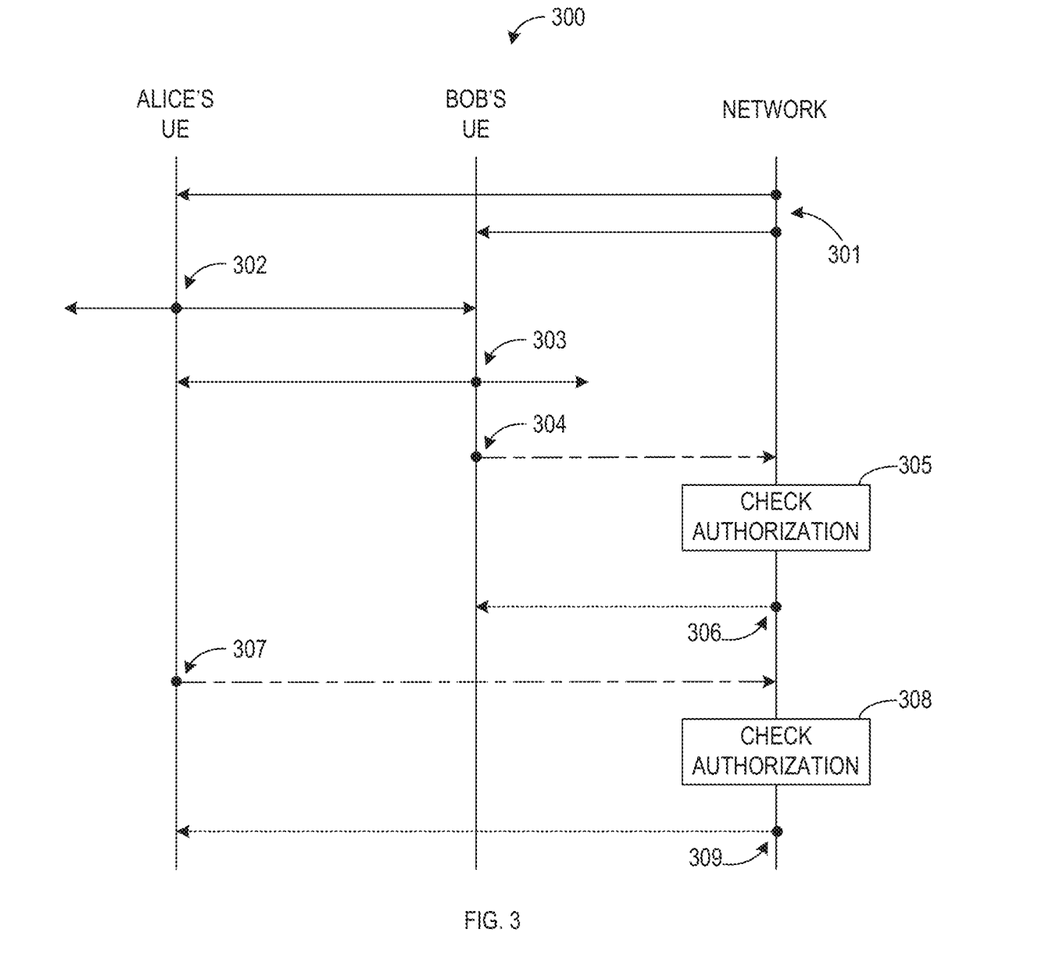
FIG. 3 illustrates generally a method of providing privacy while employing proximity-base services that are assisted by a network resource or element.

FIG. 3 illustrates generally a method 300 of providing privacy while employing proximity-base services that are assisted by a network resource or element. At 301, the network can allocate temporary IDs including temporary IDs to Alice's and Bob's UEs. At 302, Alice's UE can broadcast discovery information including her social media temporary ID. At 303, Bob's UE can broadcast discovery information including his social media temporary ID. At 304, Bob's UE can request resolution of Alice's temporary ID from a network resource or entity. At 305, the network can check if Bob's UE is authorized to have Alice's temporary ID resolved. Alice may have previously authorization the network to resolve her temporary ID for Bob in response to a previous request or because Bob, or his temporary ID, is on a list Alice provided to the network that can allow the network to provide automatic resolution of Alice's temporary ID in response to a request from Bob's UE. At 306, if Bob is an authorized user of the application, and Alice has authorized Bob to discover her, the network can send Alice's permanent ID to Bob's UE. If Bob is not an authorized user of the application, the network can deny Bob's resolution request. In certain examples, if Bob is not an authorized by Alice to have Alice's temporary ID resolved, Alice can have the network deny Bob's resolution request. In some examples, if Bob is not an authorized by Alice to have Alice's temporary ID resolved, Alice can inquire online, such as through e-mail or text messaging, or offline, such as by looking around to learn the identity of Bob, and then authorize the network to resolve her temporary ID or deny Bob's resolution request.

At 307, Alice's UE can send a request to resolve Bob's temporary social media ID. At 308, the network can check whether Alice's UE is authorized to have Bob's social media temporary ID resolved. In certain examples, if the network can not find authorization for Alice's request, the network can deny the request or the network can prompt Bob via Bob's UE to accept or deny the request. At 309, once authorized, if not already, the network can send Bob's permanent ID to Alice's UE.

Figure 4:
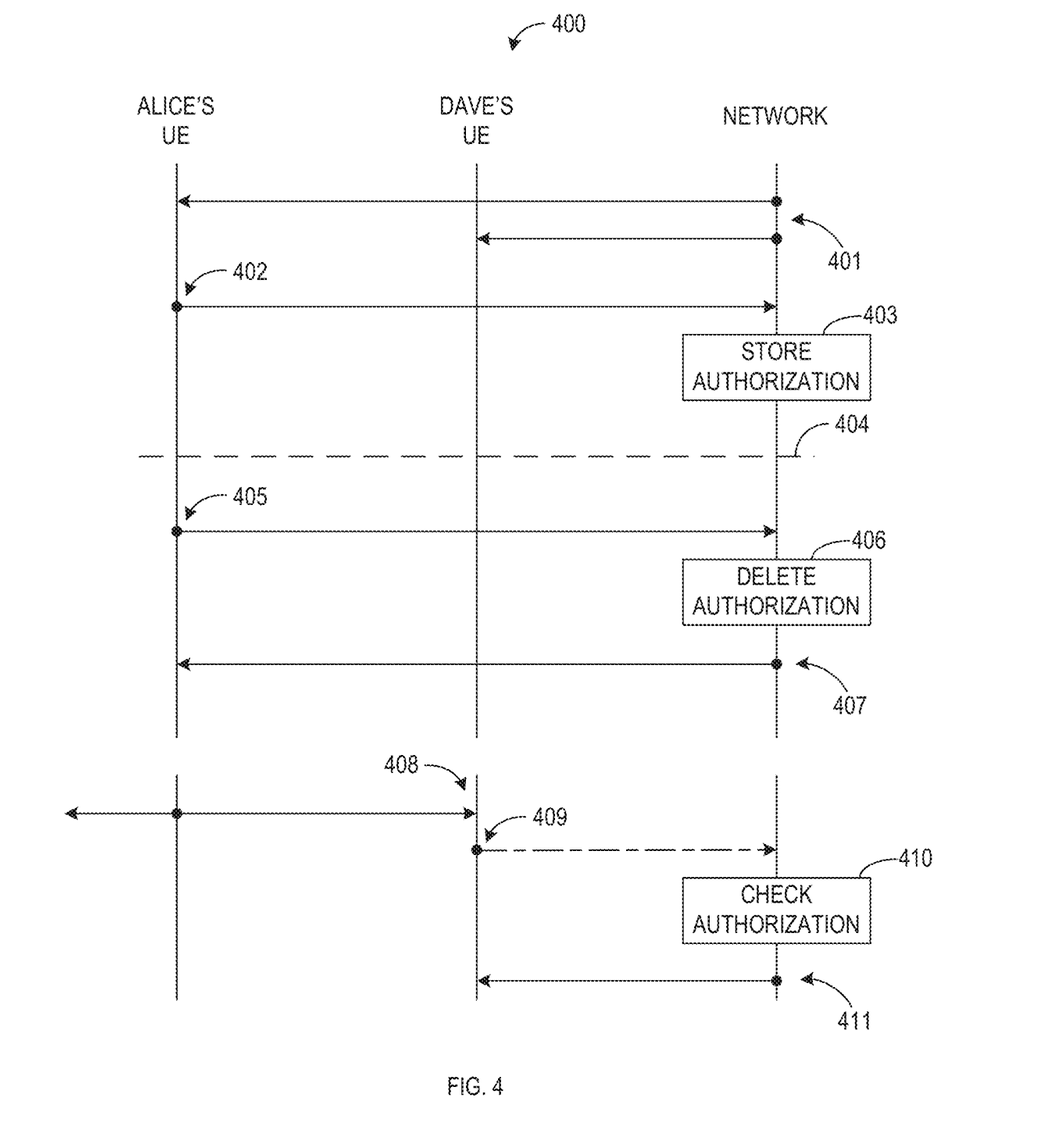
FIG. 4 illustrates generally a method of providing privacy while employing proximity-base services that are assisted by a network resource or element.

FIG. 4 illustrates generally a method 400 of providing privacy while employing proximity-base services that are assisted by a network resource or element. In certain examples, a network can allocate temporary IDs and can perform the resolution between temporary ID and permanent ID. In certain examples, such privacy functionality can be provided by a new network resource or entity that could be referred to as a ProSe-Server. In some examples, the privacy functionality could be implemented as a logical entity in an existing network element or resource. At 401, the network can allocate temporary IDs to the UEs of Alice and Dave. At 402, Alice can authorized the network to resolve her temporary ID for Dave's UE when the UEs are in proximity to each other. In certain examples, at 403, the authorization can be stored on a network resource or entity. At 404, Alice and Dave split up, and at 405, Alice can revoke her authorization of Dave to discover her proximity. At 406, in certain examples, the authorization can be deleted from the network. At 407, Alice's temporary ID can be changed or replaced by the network in response to the revocation of authorization. At 408, if Dave's UE is receiving the new unknown temporary ID, it is not able to resolve it and to recognize Alice. At 409, Dave's UE could transmit a request to resolve the temporary ID. At 410, the network can check for an authorization, and because no authorization exists, the network, at 411, can deny the request. In some examples, the network may provide a notification to Alice's UE indicating a request for resolution of her temporary ID and allow Alice to decide whether to authorize the resolution or deny the request.

In certain examples, and in reference to FIGS. 3 and 4, if Bob's UE receives Alice's new or replacement temporary ID, a request sent from Bob's UE to Alice's UE can be authorized since a request from Bob's UE is still authorized by Alice. In certain examples, a request from bob's UE to Alice's UE can be resolved without interaction on Alice's part. In some examples, Alice's new or replacement temporary ID could be sent to previously authorized UEs such that Alice's discovery information can be recognized by the authorized UEs. The new temporary ID can be sent to the authorized UEs via the network, via D2D communication, or via combinations of network communications and D2D communications.

Figure 5:
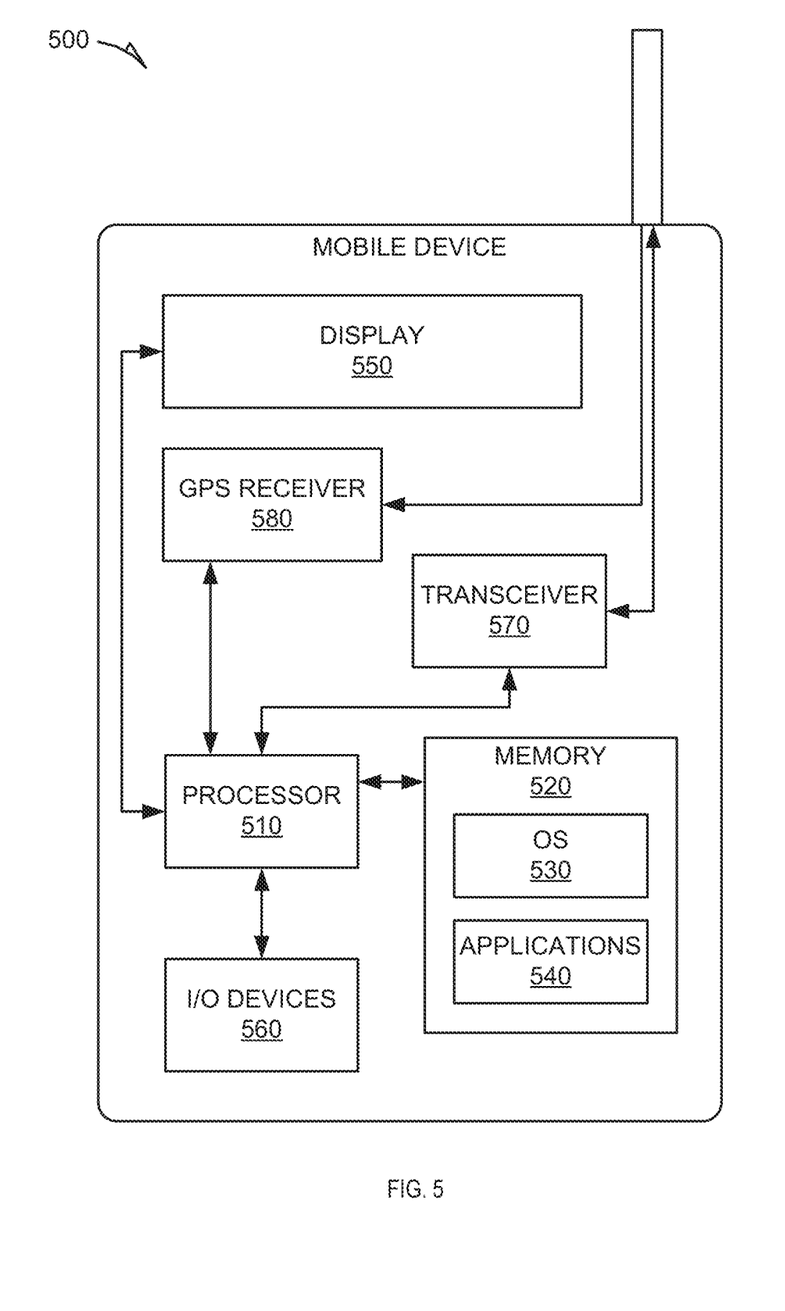
FIG. 5 is a block diagram illustrating an example mobile device upon which any one or more of the techniques (e.g., methodologies) discussed herein may be performed.

FIG. 5 is a block diagram illustrating an example mobile device 500, upon which any one or more of the techniques (e.g., methodologies) discussed herein may be performed. The mobile device 500 may include a processor 510. The processor 510 may be any of a variety of different types of commercially available processors suitable for mobile devices, for example, an XScale architecture microprocessor, a Microprocessor without Interlocked Pipeline Stages (MIPS) architecture processor, or another type of processor. A memory 520, such as a Random Access Memory (RAM), a Flash memory, or other type of memory, is typically accessible to the processor 510. The memory 520 may be adapted to store an operating system (OS) 530, as well as application programs 540. The OS 530 or application programs 540 may include instructions stored on a computer readable medium (e.g., memory 520) that may cause the processor 510 of the mobile device 500 to perform any one or more of the techniques discussed herein. The processor 510 may be coupled, either directly or via appropriate intermediary hardware, to a display 550 and to one or more input/output (I/O) devices 560, such as a keypad, a touch panel sensor, a microphone, etc. Similarly, in an example embodiment, the processor 510 may be coupled to a transceiver 570 that interfaces with an antenna 590. The transceiver 570 may be configured to both transmit and receive cellular network signals, wireless data signals, or other types of signals via the antenna 590, depending on the nature of the mobile device 500. Further, in some configurations, a GPS receiver 580 may also make use of the antenna 590 to receive GPS signals.

Figure 6:
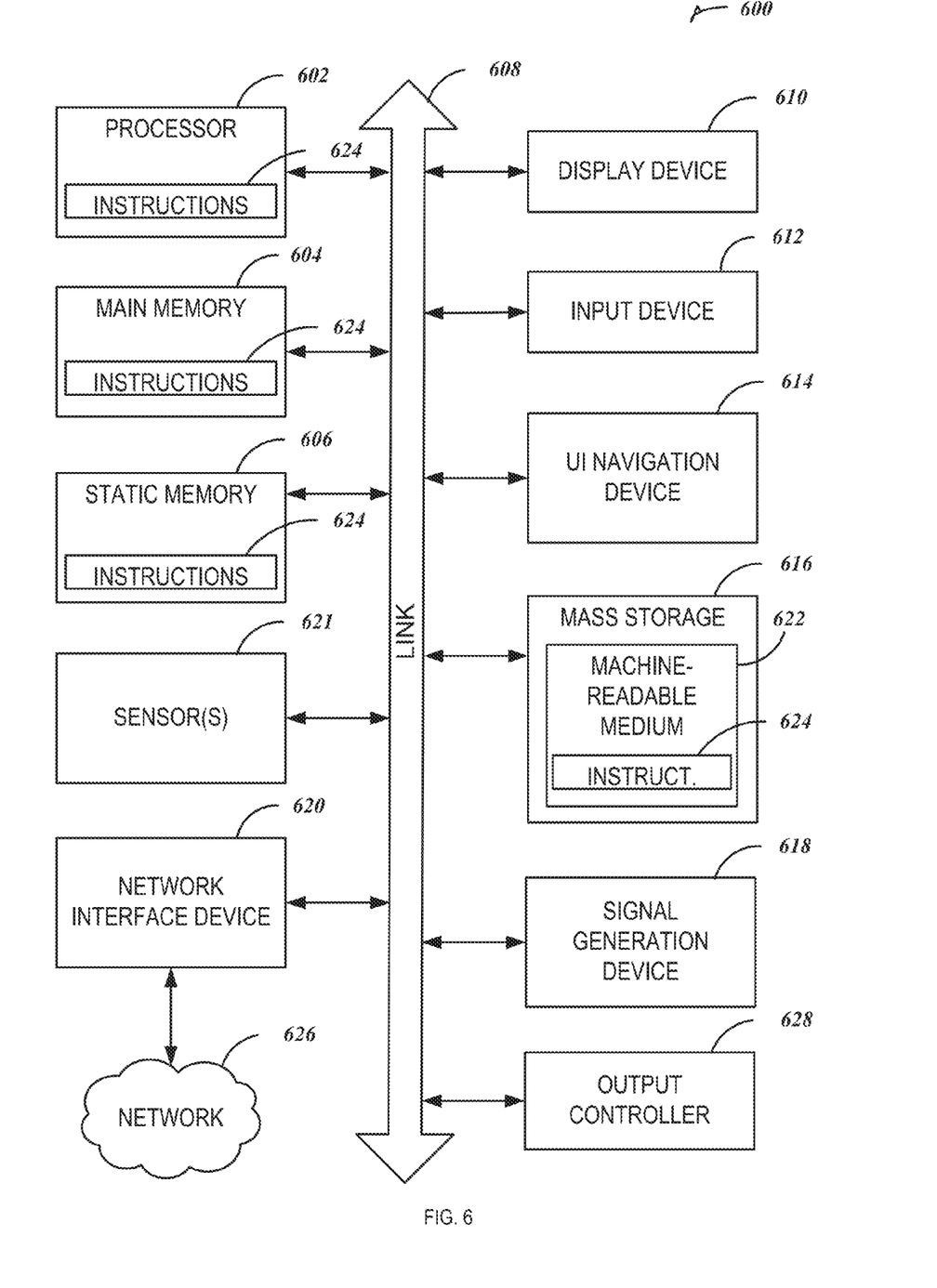
FIG. 6 illustrates a block diagram of an example machine.

FIG. 6 illustrates a block diagram of an example machine 600 upon which any one or more of the techniques (e.g., methodologies) discussed herein may be performed. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a Personal Digital Assistant (PDA), a mobile telephone, a web appliance, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside (1) on a non-transitory machine-readable medium or (2) in a transmission signal. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 600 may include a hardware processor 602 (e.g., a processing unit, a graphics processing unit (GPU), a hardware processor core, or any combination thereof), a main memory 604, and a static memory 606, some or all of which may communicate with each other via a link 608 (e.g., a bus, link, interconnect, or the like). The machine 600 may further include a display device 610, an input device 612 (e.g., a keyboard), and a user interface (UI) navigation device 614 (e.g., a mouse). In an example, the display device 610, input device 612, and UI navigation device 614 may be a touch screen display. The machine 600 may additionally include a mass storage (e.g., drive unit) 616, a signal generation device 618 (e.g., a speaker), a network interface device 620, and one or more sensors 621, such as a global positioning system (GPS) sensor, camera, video recorder, compass, accelerometer, or other sensor. The machine 600 may include an output controller 628, such as a serial (e.g., universal serial bus (USB), parallel, or other wired or wireless (e.g., infrared (IR)) connection to communicate or control one or more peripheral devices (e.g., a printer, card reader, etc.).

The mass storage 616 may include a machine-readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the mass storage 616 may constitute machine-readable media.

While the machine-readable medium 622 is illustrated as a single medium, the term "machine readable medium" may include a single medium or multiple media (e.g., a centralized or distributed database, and/or associated caches and servers) that configured to store the one or more instructions 624.

The term "machine-readable medium" may include any tangible medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). The term "transmission medium" shall be taken to include any intangible medium that is capable of storing, encoding or carrying instructions for execution by the machine 600, and includes digital or analog communications signals or other intangible medium to facilitate communication of such software.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

Figure 7:
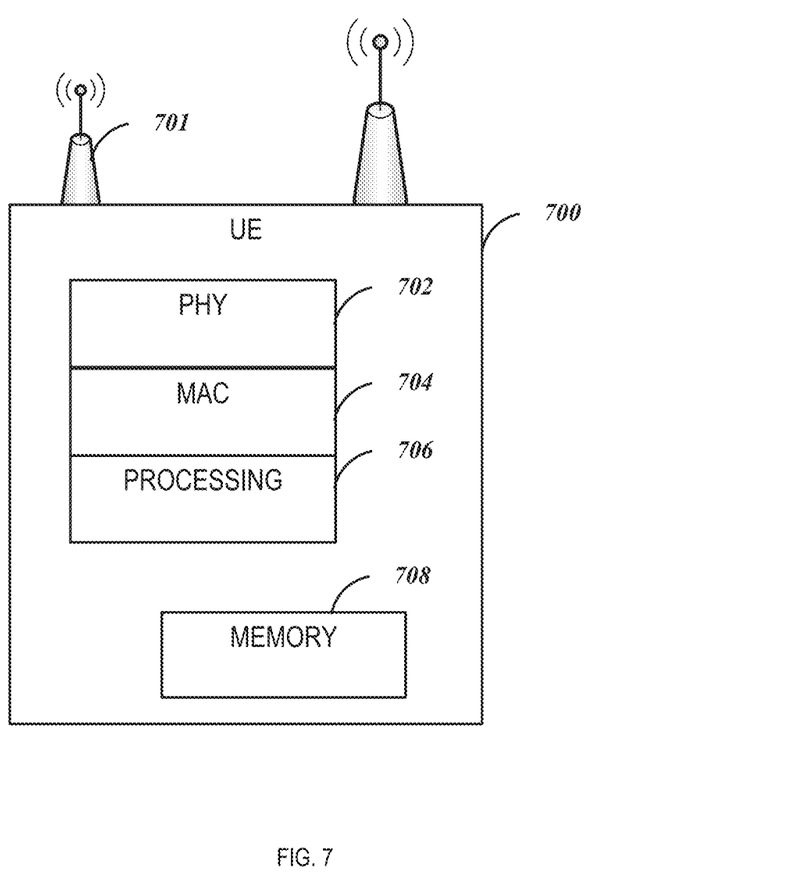
FIG. 7 illustrates a functional block diagram of an example machine 700 (e.g., a UE) in accordance with some embodiments.

FIG. 7 illustrates a functional block diagram of an example machine 700 (e.g., a UE) in accordance with some embodiments. The UE 700 may include physical layer circuitry 702 for transmitting and receiving signals to and from eNBs using one or more antennas 701. UE 700 may also include processing circuitry 706 that may include, among other things a channel estimator. UE 700 may also include a memory 708. The processing circuitry may be configured to determine several different feedback values discussed below for transmission to the eNB. The processing circuitry may also include a media access control (MAC) layer 704.

In some embodiments, the UE 700 may include one or more of a keyboard, a display, a non-volatile memory port, multiple antennas, a graphics processor, an application processor, speakers, and other mobile device elements. The display may be an LCD screen including a touch screen.

The one or more antennas 701 utilized by the UE 700 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated to take advantage of spatial diversity and the different channel characteristics that may result between each of antennas and the antennas of a transmitting station. In some MIMO embodiments, the antennas may be separated by up to $1/10$ of a wavelength or more.

Although the UE 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors of the UE 700 may be configured with the instructions to perform the operations described herein.

In some embodiments, the UE 700 may be configured to receive OFDM communication signals over a multicarrier communication channel in accordance with an OFDMA communication technique. The OFDM signals may comprise a plurality of orthogonal subcarriers. In some broadband multicarrier embodiments, eNBs (including macro eNB and pico eNBs) may be part of a broadband wireless access (BWA) network communication network, such as a Worldwide Interoperability for Microwave Access (WiMAX) communication network or a 3rd Generation Partnership Project (3GPP) Universal Terrestrial Radio Access Network (UTRAN) Long-Term-Evolution (LTE) or a Long-Term-Evolution (LTE) communication network, although the scope of the inventive subject matter described herein is not limited in this respect. In these broadband multicarrier embodiments, the UE 700 and the eNBs may be configured to communicate in accordance with an orthogonal frequency division multiple access (OFDMA) technique. The UTRAN LTE standards include the 3rd Generation Partnership Project (3GPP) standards for UTRAN-LTE, release 8, March 2008, and release 10, December 2010, including variations and evolutions thereof.

In some LTE embodiments, the basic unit of the wireless resource is the Physical Resource Block (PRB). The PRB may comprise 12 sub-carriers in the frequency domain x 0.5 ms in the time domain. The PRBs may be allocated in pairs (in the time domain). In these embodiments, the PRB may comprise a plurality of resource elements (REs). A RE may comprise one sub-carrier x one symbol.

Two types of reference signals may be transmitted by an eNB including demodulation reference signals (DM-RS), channel state information reference signals (CIS-RS) and/or a common reference signal (CRS). The DM-RS may be used by the UE for data demodulation. The reference signals may be transmitted in predetermined PRBs.

In some embodiments, the OFDMA technique may be either a frequency domain duplexing (FDD) technique that uses different uplink and downlink spectrum or a time-domain duplexing (TDD) technique that uses the same spectrum for uplink and downlink.

In some other embodiments, the UE 700 and the eNBs may be configured to communicate signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, the UE 700 may be part of a portable wireless communication device, such as a PDA, a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly.

In some LTE embodiments, the UE 700 may calculate several different feedback values which may be used to perform channel adaption for closed-loop spatial multiplexing transmission mode. These feedback values may include a channel-quality indicator (CQI), a rank indicator (RI) and a precoding matrix indicator (PMI). By the CQI, the transmitter selects one of several modulation alphabets and code rate combinations. The RI informs the transmitter about the number of useful transmission layers for the current MIMO channel, and the PMI indicates the codebook index of the precoding matrix (depending on the number of transmit antennas) that is applied at the transmitter. The code rate used by the eNB may be based on the CQI. The PMI may be a vector that is calculated by the UE and reported to the eNB. In some embodiments, the UE may transmit a physical uplink control channel (PUCCH) of format 2, 2a or 2b containing the CQI/PMI or RI.

In these embodiments, the CQI may be an indication of the downlink mobile radio channel quality as experienced by the UE 700. The CQI allows the UE 700 to propose to an eNB an optimum modulation scheme and coding rate to use for a given radio link quality so that the resulting transport block error rate would not exceed a certain value, such as 10%. In some embodiments, the UE may report a wideband CQI value which refers to the channel quality of the system bandwidth. The UE may also report a sub-band CQI value per sub-band of a certain number of resource blocks which may be configured by higher layers. The full set of sub-bands may cover the system bandwidth. In case of spatial multiplexing, a CQI per code word may be reported.

In some embodiments, the PMI may indicate an optimum precoding matrix to be used by the eNB for a given radio condition. The PMI value refers to the codebook table. The network configures the number of resource blocks that are represented by a PMI report. In some embodiments, to cover the system bandwidth, multiple PMI reports may be provided. PMI reports may also be provided for closed loop spatial multiplexing, multi-user MIMO and closed-loop rank 1 precoding MIMO modes.

In some cooperating multipoint (CoMP) embodiments, the network may be configured for joint transmissions to a UE in which two or more cooperating/coordinating points, such as remote-radio heads (RRHs) transmit jointly. In these embodiments, the joint transmissions may be MIMO transmissions and the cooperating points are configured to perform joint beamforming.

The example embodiments discussed herein may be utilized by wireless network access providers of all types including, but not limited to, mobile broadband providers looking to increase cellular offload ratios for cost-avoidance and performance gains, fixed broadband providers looking to extend their coverage footprint outside of customers' homes or businesses, wireless network access providers looking to monetize access networks via access consumers or venue owners, public venues looking to provide wireless network (e.g., Internet) access, or digital services (e.g. location services, advertisements, entertainment, etc.) over a wireless network, and business, educational or non-profit enterprises that desire to simplify guest Internet access or Bring-Your-Own-Device (BYOD) access.

ADDITIONAL NOTES

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A non-transitory computer-readable storage medium that stores instructions for execution by processing circuitry of a wireless communication device for protecting a user identity for device-to-device communication enabled user equipment, the instructions to configure the device to perform operations to:

transmit a first temporary identification and first discovery information from a first user equipment (UE), the discovery information authorizing discovery of the first UE;

receive a request at the first UE from a second UE to join a device-to-device network with the first UE using a second temporary identification associated with the second UE;

resolve the first temporary address to provide a permanent ID associated with the first UE using previously stored resolution information associated with the permanent ID of the first UE and the first temporary ID; and resolve the second temporary ID at the first UE to provide a permanent ID associated with the second UE using previously stored resolution information associated with the permanent ID of the second UE and the second temporary ID.

2. The non-transitory computer-readable storage medium of claim 1, wherein the request includes an indication that the request is responsive to the discovery information.

3. The non-transitory computer-readable storage medium of claim 1, the instructions to further configure the device to perform operations to transmit the permanent ID of the first UE to the second UE.

4. The non-transitory computer-readable storage medium of claim 3, wherein the instructions to configure the device to transmit the permanent ID of the first UE further include instruction to configure the device to re-transmit an indication received with the request, wherein the indication indicates that the request was responsive to the discovery information.

5. The non-transitory computer-readable storage medium of claim 1, wherein the instructions to configure the device to resolve the first temporary ID further include instruction to configure the device to resolve the first temporary ID at a network resource to provide a permanent ID associated with the first UE using previously stored resolution information associated with the permanent ID of the first UE and the first temporary ID.

6. The non-transitory computer-readable storage medium of claim 1, wherein the instructions to configure the device to resolve the second temporary ID further include instruction to configure the device to verify that the second UE is a previously authorized UE.

7. The non-transitory computer-readable storage medium of claim 1, the instructions to further configure the device to perform operations to save identification information for one or more authorized UEs associated with the first UE on memory of the first UE.

8. The non-transitory computer-readable storage medium method of claim 7, the instructions to further configure the device to perform operations to associate a new temporary ID with each authorized UE of the one or more authorized UEs.

9. The non-transitory computer-readable storage medium of claim 8, the instructions to further configure the device to perform operations to periodically replace the new temporary ID for one of the one or more authorized UEs with a replacement temporary ID.

10. The non-transitory computer-readable storage medium of claim 9, wherein instructions to configure the device to periodically replace the new temporary ID further include instructions to configure the device to receive the replacement ID from a network resource.

11. The non-transitory computer-readable storage medium of claim 1, the instructions to further configure the device to perform operations to periodically replace the first temporary ID with a first replacement temporary ID.

12. The non-transitory computer-readable storage medium of claim 11, wherein the instructions to configure the device to periodically replace the first temporary ID further include instructions to configure the device to receive the first replacement ID from a network resource.

13. The non-transitory computer-readable storage medium of claim 11, wherein the instructions to configure the device to periodically replace the first temporary ID further include instructions to configure the device to generate the first replacement ID at the first UE using a permutation algorithm simultaneously with generating the replacement ID at a network resource using the permutation algorithm.

14. The non-transitory computer-readable storage medium of claim 1, wherein the discovery information is generated from an application configured to run on the firs UE.

15. The non-transitory computer-readable storage medium of claim 1, wherein the discovery information is generated from a social media application configured to run on the first UE.

16. The non-transitory computer-readable storage medium of claim 1, wherein the discovery information is generated from a gaming application configured to run on the first UE.

17. A non-transitory computer-readable storage medium that stores instructions for execution by processing circuitry of a wireless communication device to configure the device to perform operations to:

transmit a first temporary identification and first discovery information from a first user equipment (UE), the discovery information authorizing discovery of the first UE;

receive a request at the first UE from a second UE to join a device-to-device network with the first UE using a second temporary identification associated with the second UE;

periodically replace the first temporary ID with a first replacement temporary ID; and wherein the instructions to periodically replace the first temporary ID include instructions to generate the first replacement ID at the first UE using a permutation algorithm simultaneously with generating the replacement ID at a network resource using the permutation algorithm.

18. The non-transitory computer-readable storage medium of claim 17, including resolving the first temporary address to provide a permanent ID associated with the first UE using previously stored resolution information associated with the permanent ID of the first UE and the first temporary ID.

19. The non-transitory computer-readable storage medium of claim 18, including resolving the second temporary ID at the first UE to provide a permanent ID associated with the second UE using previously stored resolution information associated with the permanent ID of the second UE and the second temporary ID.

* * * * *

UNITED STATES PATENT AND TRADEMARK OFFICE
CERTIFICATE OF CORRECTION

PATENT NO. : 9,559,761 B2  
APPLICATION NO. : 14/141843  
DATED : January 31, 2017  
INVENTOR(S) : Luft et al.

Page 1 of 1

It is certified that error appears in the above-identified patent and that said Letters Patent is hereby corrected as shown below:

On the Title Page

On page 2, in Column 2, under "Other Publications", Line 14, delete "Sep. 26," and insert --Sep. 25,-- therefor In the Claims In Column 14, Line 23, in Claim 14, delete "firs" and insert --first-- therefor Signed and Sealed this
Twenty-eighth Day of May, 2019

Andrei Iancu
*Director of the United States Patent and Trademark Office*